(12) United States Patent
Neofotistos et al.

(10) Patent No.: US 6,620,318 B1
(45) Date of Patent: Sep. 16, 2003

(54) MODULAR DISINFECTION SYSTEM FOR FLUIDS

(75) Inventors: Paris Neofotistos, Midlothian, VA (US); Kevin M. Smith, Richmond, VA (US)

(73) Assignee: Infilco Degremont Inc., Richmond, VA (US)

( * ) Notice: Subject to any disclaimer, the term of this patent is extended or adjusted under 35 U.S.C. 154(b) by 0 days.

(21) Appl. No.: 09/578,147

(22) Filed: May 24, 2000

(51) Int. Cl.[7] ............................................. B01D 35/28
(52) U.S. Cl. ...................... 210/243; 210/192; 250/435; 250/436; 250/438; 422/24
(58) Field of Search ................................. 250/435, 436, 250/438; 210/192, 243; 422/24, 243

(56) References Cited

U.S. PATENT DOCUMENTS

| | | | | |
|---|---|---|---|---|
| 3,644,727 A | * | 2/1972 | Garrett et al. ............... | 362/218 |
| 4,255,663 A | * | 3/1981 | Lewis ........................ | 250/436 |
| 4,757,205 A | * | 7/1988 | Latel et al. .................. | 250/435 |
| 5,006,244 A | * | 4/1991 | Maarschalkerweerd ..... | 210/243 |
| 5,368,826 A | * | 11/1994 | Weltz et al. ................. | 422/243 |
| 6,097,424 A | * | 8/2000 | Zernov et al. ............... | 348/373 |

* cited by examiner

Primary Examiner—John R. Lee
Assistant Examiner—Erin-Michael Gill
(74) Attorney, Agent, or Firm—Piper Rudnick LLP

(57) ABSTRACT

A modular ballast enclosure for use in a fluid disinfection system. The enclosure has an enclosure wall, preferably comprising a thermally conductive material, and at least one ballast within the enclosure wall for powering a lamp module. At least one portion of the enclosure wall is adjacent to a lamp module in a fluid channel. The enclosure also has a receptacle on the modular ballast unit adapted to receive a connection from the lamp module.

23 Claims, 6 Drawing Sheets

MODULAR DISINFECTION SYSTEM FOR FLUIDS

FIELD OF THE INVENTION

This invention relates to fluid disinfection systems. In particular, the invention relates to using a modular ballast enclosure to power lamp modules for the ultraviolet (hereinafter "UV") disinfection of water and wastewater.

BACKGROUND OF THE INVENTION

Historically, the most widely used technique for purifying large quantities of water has been the addition of small quantities of chlorine or chlorine releasing compounds to the water, sufficient to destroy undesirable micro-organisms. However, chlorination tends to render the water less acceptable for drinking or bathing, particularly if the chlorine concentration and pH of the water are not carefully controlled. Furthermore, chlorine may interact with other compounds present in the water to leave low concentrations of possibly harmful chemicals.

Recently, it has become popular to introduce UV light into a fluid channel for water purification purposes. It has been known for many years that UV light at appropriate wavelengths has powerful germicidal properties. Using UV light avoids the disadvantages associated with chlorination mentioned above. However, wastewater disinfection systems utilizing UV treatment of wastewater, such as industrial and municipal wastewater, rely on complex systems presenting a wide variety of problems and challenges. The problems associated with such complex systems are enhanced in view of the wide span of engineering and scientific disciplines encountered, such as civil and electrical engineering, computer hardware and software design, biology, chemistry and the like, in the design and construction of effective treatment systems. Most of the problems associated with such treatment are problems of implementation, such as finding equipment which is readily and economically maintained. Other problems include difficulties in designing and constructing low maintenance and/or easily serviceable UV disinfection systems.

For example, it is known that radiation from UV light producing lamps utilized in UV disinfection systems decreases with time. There is typically a rapid drop in radiation during the first 100 hours of operation. Following this initial period, the decline in efficiency continues but at a much slower rate. After approximately 8800 hours of "on" service, or about one year of continuous operation, lamp efficiency drops to about 65% of its efficiency after the first 100 hours and typically no longer provides sufficient intensity to achieve the desired degree of disinfection. At this point, to maintain operating efficiency, the system lamps are usually replaced. Most UV installations replace lamps yearly to ensure adequate wastewater disinfection. Some lamps are replaced before they have been in "on" service a full year. For example, the use of control schemes, which turn banks of lamps on and off in response to changes in wastewater flow to minimize electrical power consumption, tends to reduce filament life. Generally, however, a standard lamp has a filament life of 2000–3000 on-off cycles after which time the lamp must be replaced.

The need to frequently replace lamps is further compounded by the problem that the lamps are submerged in a moving body of water, typically an open channel, which should remain continuously operational to maximize efficiency. Removing lamps or banks of lamps from the wastewater flow can lead to significant efficiency losses due to water treatment stoppage, added personnel costs and the like.

U.S. Pat. No. 5,368,826 to Weltz et al. has attempted to address these problems by providing control apparatus for wastewater disinfection systems which permit fewer lamp replacements, reduce personnel requirements, minimize maintenance monitoring and curtail electrical consumption. However, regardless of the control system employed, the lamp units inevitably will degrade or fail and will need to be replaced.

U.S. Pat. No. 4,757,205 to Latel provides a system that purports to facilitate replacing the lamp units in a UV disinfection system. In particular, the '205 patent shows an ultraviolet water treatment plant in which individual ultraviolet lamps are loosely and retractably located within frames or "lamp modules" supported in a water treatment channel. Individual lamp modules supporting arrays of parallel lamp units may be removed from the channel, and the lamp units may be individually disengaged from the frame and disassembled for lamp replacement. The frames have unitary plug connectors to a power supply arranged so that the plug of a frame must be disengaged before that frame can be removed from the channel. However, the weight of the lamp modules in such as system makes it difficult to remove the modules when the lamps need replacement.

One element that comprises a substantial portion of the overall weight of the lamp module is a ballast. Although not disclosed in the '205 patent, it is known in the art that a ballast must be provided in the disinfection system to control the power to the lamp modules. For example, FIG. 1 of U.S. Pat. No. 5,006,244 to Maarschalkerweerd shows a ballast 2 for controlling the voltage and amperage through the ultraviolet lamps 14. To initially energize the lamps, high voltage on the order of 600 volts at the ballast is required, but once the lamps are energized, a lower voltage, for example, 180 volts at the ballast is sufficient. This variation of voltage is provided by the ballast. The ballast also functions to limit the amperage through the lamps.

In most UV disinfection systems, such as the system disclosed in FIG. 1 of the '244 patent, the ballast is mounted to the frame legs of the lamp module. However, incorporating the ballast into the lamp module frame adds significant weight to the lamp module making the module heavy and difficult to manage. Due to the ballast being located on the lamp module frame, these lamp modules typically weigh between 30–50 lbs and require special lifting equipment for removing the module from a channel.

Some prior art systems have attempted to solve this problem by manufacturing lightweight lamp modules and locating the ballast in a control panel. However, the control panels in these systems necessarily must be custom designed to service a specific number of lamp modules. For example, if a six lamp—system is desired, a custom control panel would be manufactured for the system, including a fixed number of ballasts to supply power to each module. If at a later time, the system needs to be modified to accommodate an additional lamp module, the control panel would need to be completely re-wired and, most likely, would structurally need to be modified to accommodate the additional ballasts. Thus, custom control panels are not cost effective to manufacture since each panel must be designed and manufactured according to the number of lamp modules in the system. Furthermore, since it is known in the art that the distance between the ballast and the lamp module should be minimized for proper performance, the control panel would need to be located near the lamp modules it services. Thus, such an arrangement prohibits remote placement of control panels in a central location and imposes an undesired restriction on installation of the system.

Neither of these prior art schemes are suitable for both cost effective modular production of UV systems and easy servicing of the system. The present invention reduces the complexities associated with manufacturing customized systems while providing for easy servicing of the lamp modules and associated ballasts. Since the ballasts are located in separate modular ballast enclosures, the invention accommodates a variety of different lamp configurations according to user-defined system requirements. Furthermore, by adding or removing modular ballast enclosures and lamp modules, a disinfection system of the invention can be easily re-configured on an as-needed basis. In addition, the modular aspect of the invention provides for ease of manufacturing in an assembly line manner, as opposed to custom designs of the prior art, and eliminates the need for cumbersome, heavy lamp modules which can be expensive and difficult to handle.

SUMMARY OF THE INVENTION

The invention relates to a disinfection system for fluids in a channel. The disinfection system includes a lamp module and a modular ballast enclosure. The lamp module has at least one lamp, but preferably, has a plurality of lamps. The modular ballast enclosure is preferably constructed of a thermally conductive material and is located adjacent to the channel. The enclosure has an enclosure wall, a ballast for powering the lamp module, and a receptacle on the modular ballast enclosure adapted to receive a connection from the lamp module. In one preferred embodiment of the invention, the ballast enclosure is preferably substantially environmentally sealed. Other embodiments may comprise one or more of the following: a ballast, circuitry for monitoring lamp and module status, such as, for example, at least one LED to display the status of each lamp, ground fault circuit interrupter(s), a power source, and a power connector (preferably a multi-pin connector) adapted to receive power from the power source.

A modular ballast enclosure of the invention preferably has a width substantially equal to a width of the lamp module. For example, a lamp module designed to be three inches wide for three inch spacing of the UV lamps preferably has a corresponding ballast enclosure that is three inches wide in order to visually line up with the module and be installed in close proximity to the module. Ballast enclosures are preferably environmentally rated and suitable for indoor or outdoor installation. At least a portion of the ballast unit wall should be thermally conductive and substantially adjacent to the lamp module and the fluid channel.

DESCRIPTION OF THE DRAWINGS

For the purpose of illustrating the invention, there is shown in the drawings a form which is presently preferred; it being understood, however, that this invention is not limited to the precise arrangements and instrumentality shown.

DETAILED DESCRIPTION OF THE INVENTION

While the invention will be described in connection with one or more preferred embodiments, it will be understood that the description is not intended to limit the invention to the described embodiments. On the contrary, the description is intended to cover all alternatives, modifications and equivalents as may be included within the spirit and scope of the invention as defined by the appended claims.

Figure 1:
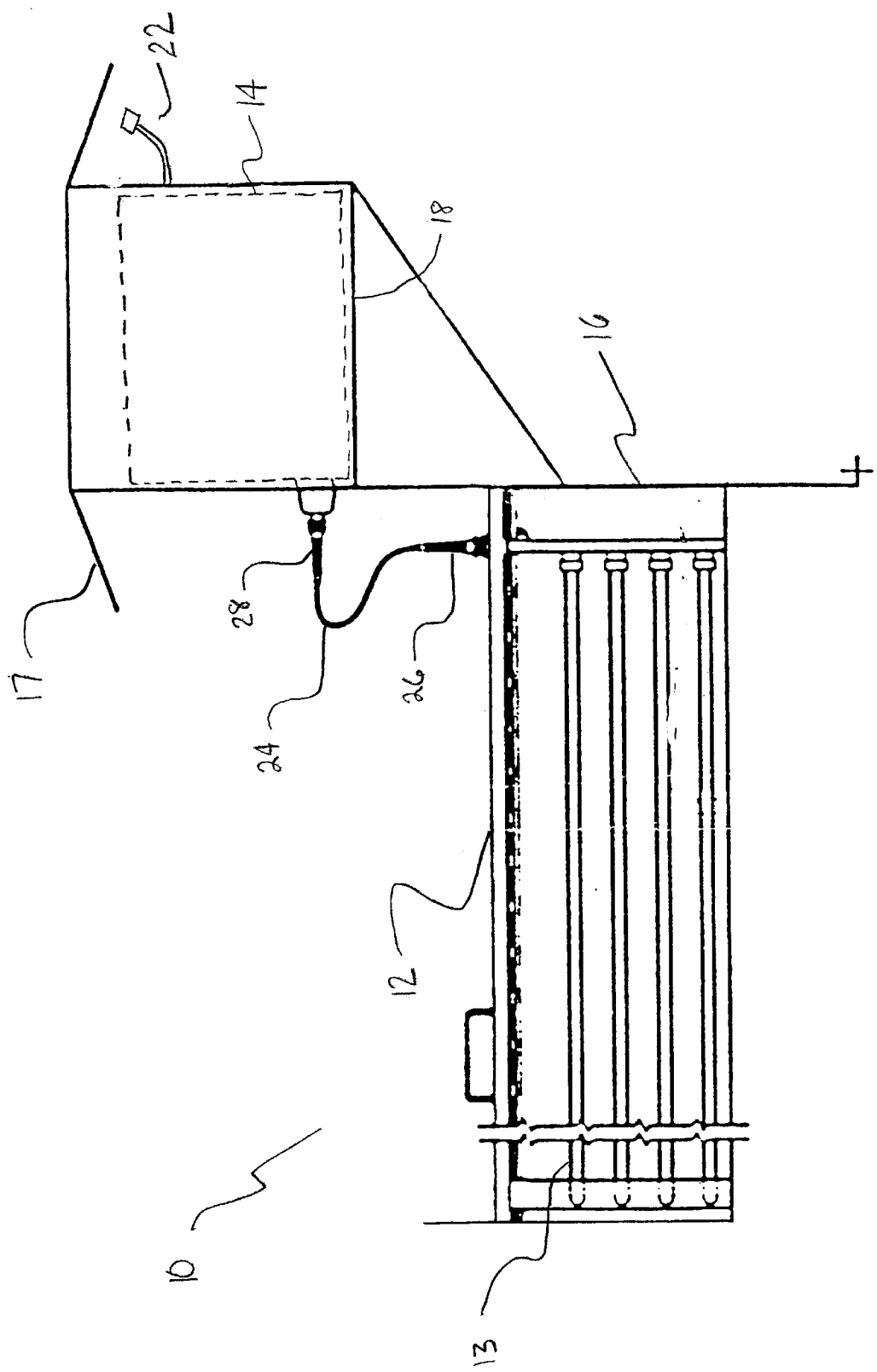
FIG. 1 is a side view of a disinfection system according to an embodiment of the present invention.
Figure 2:
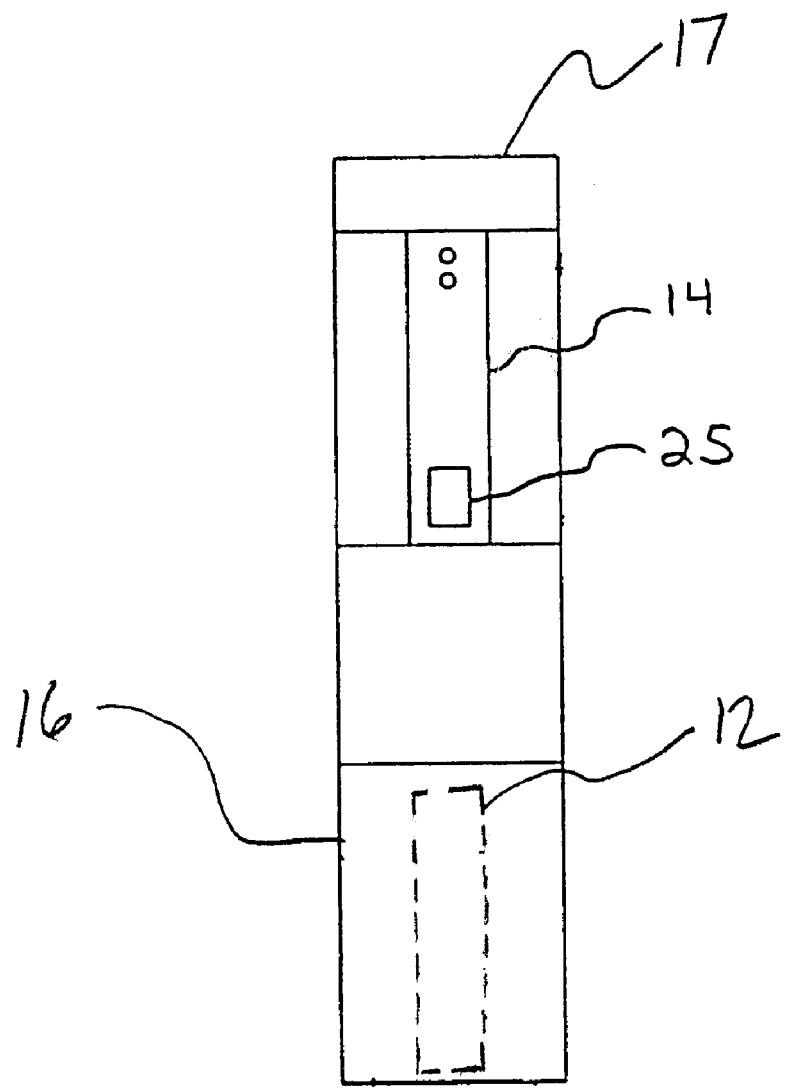
FIG. 2 is a front view of the disinfection system of FIG. 1.

Referring now to the drawings, wherein like numerals indicate like elements, there is shown in FIG. 1 a disinfection system 10 for fluids in accordance with the present invention. Disinfection system 10 comprises a lamp module 12, comprising at least one lamp 13, and a modular ballast enclosure 14. In the embodiment depicted in FIG. 1, the modular ballast enclosure 14 is located on a fluid channel 16. Preferably, enclosure 14 is removably mounted to the channel 16. However, the invention also contemplates locating enclosure 14 at any area adjacent channel 16. To reduce cable lengths, enclosure 14 is preferably located less than about 12 feet from the lamp module 12. Enclosure 14 may be at least partially constructed of a thermally conductive material, such as, for example, stainless steel or aluminum, in a preferred embodiment. Ballast enclosure 14 is preferably environmentally rated allowing installation indoors and/or outdoors.

Figure 3:
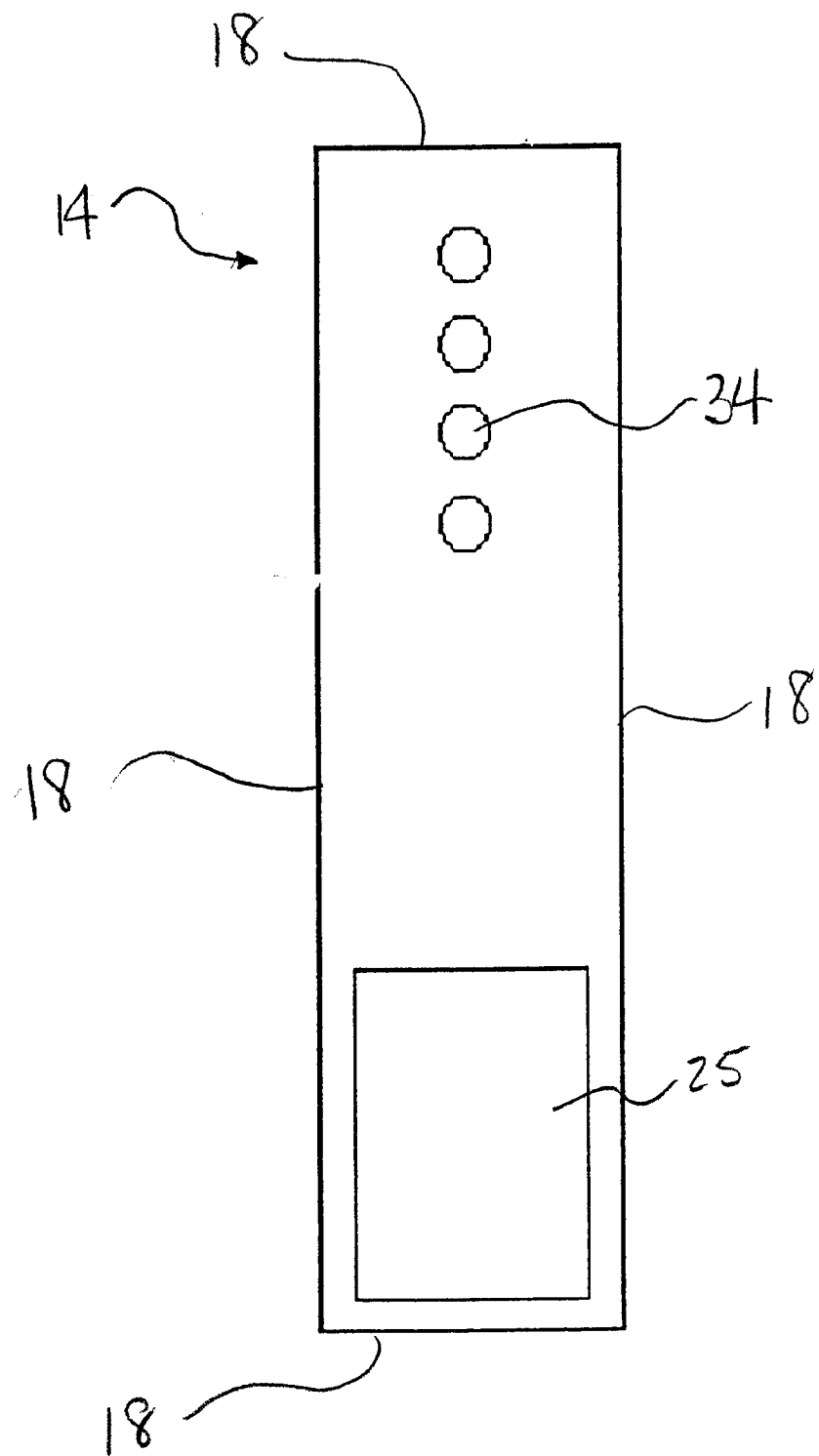
FIG. 3 is a front view of a modular ballast enclosure according to another embodiment of the present invention.
Figure 5:
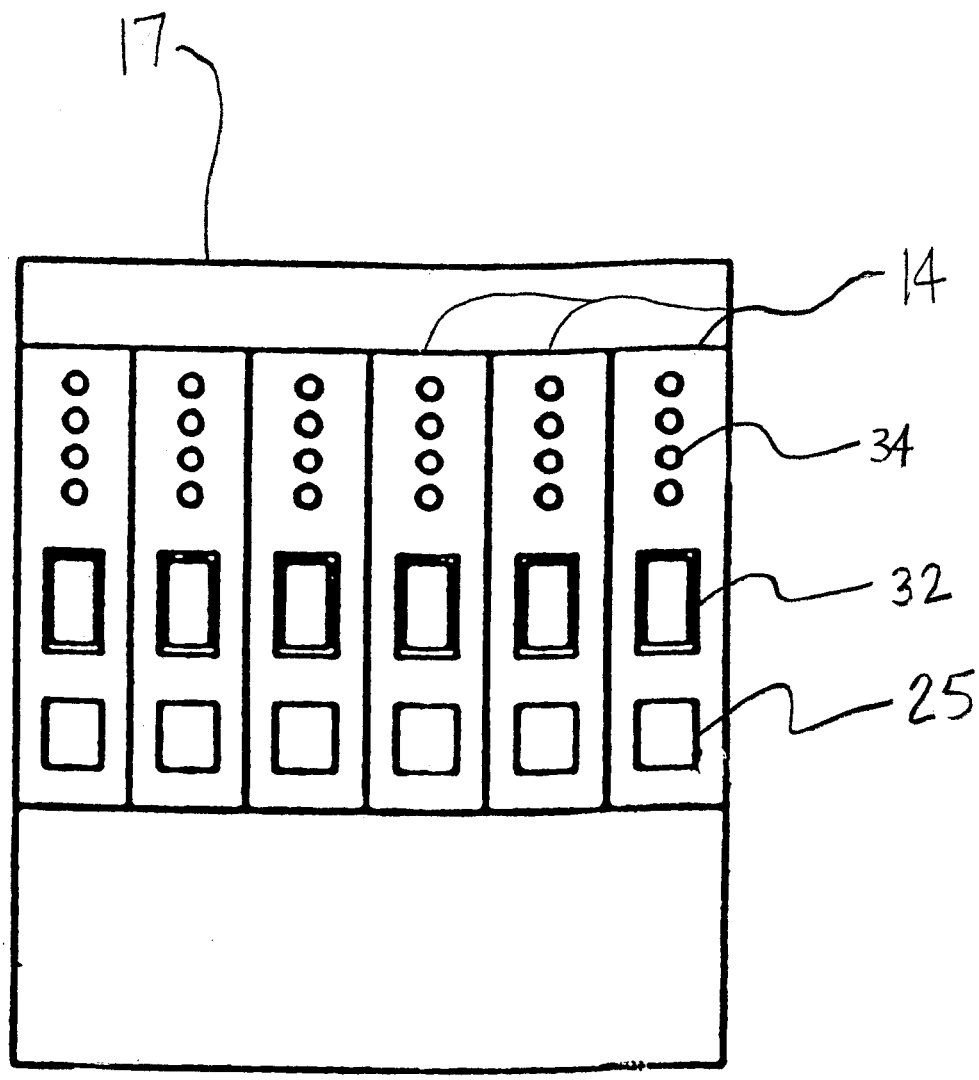
FIG. 5 is a front view of a disinfection system comprising six (6) modular ballast enclosures according to another embodiment of the present invention.

FIG. 3 shows the enclosure 14 having a plurality of enclosure walls 18. However, it should be understood that the invention also contemplates at least one wall of any of a number of different shapes, such as, for example, an elliptical wall, a cylindrical wall or a spherical wall. In a preferred embodiment, the system 10 has a predetermined number of modular ballast enclosures 14, the number preferably selected to match the number of lamp modules 12 in the system 10. For example, FIG. 5 shows six modular ballast enclosures 14 mounted within a sunshield 17. The modular ballast enclosures 14 may be removably mounted to at least one wall of the sunshield 17 in an embodiment of the invention. In yet another embodiment, the plurality of enclosure walls 18 of one of the modular ballast enclosures 14 forms a width that is substantially equal to the width of one of the lamp modules 12. Preferably, the width of the modular ballast enclosure is three inches, which is the industry standard width of a typical lamp module.

Figure 4:
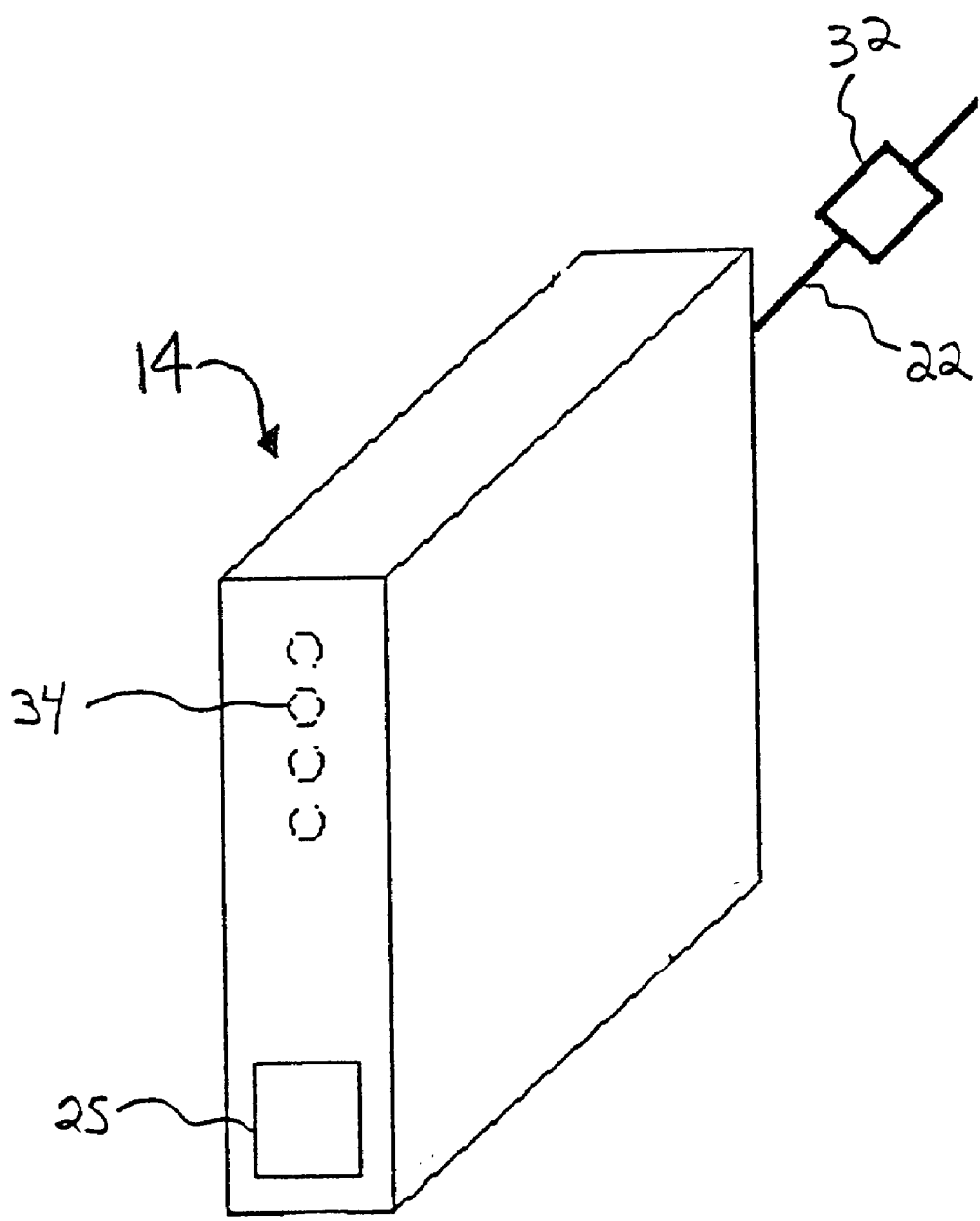
FIG. 4 is a perspective view of a modular ballast enclosure according to another embodiment of the present invention.

Referring to FIG. 1 and FIG. 4, there is shown a power cord 22 on the modular ballast enclosure 14. The power cord 22 is adapted to receive power from a power source. The power source may be controlled by a control panel or through a distribution power box. As shown in FIG. 1, the lamp module 12 also comprises a cable 24 adapted for removable connection to the ballast enclosure 14. Preferably, the cable 24 has a pair of ends with a cord grip and strain relief lamp connection 26 on one of its ends and a ballast enclosure connector 28 on the other of its ends. In an embodiment of the invention, either the lamp connection 26 or the ballast enclosure connector 28 is a quick disconnect plug. Both the lamp connection 26 and the ballast enclosure connector 28 may be multi-pin connectors. In the embodiments shown in FIGS. 2–5, each modular ballast enclosure 14 has a receptacle 25 for receiving a connection the cable 24. The modular ballast enclosure 14 provides power to the lamp module 12 via the cable 24.

As shown in FIGS. 1 and 5, the system 10 may also further comprise a sunshield 17 to block sunlight from direct contact with enclosure 14. The sunshield 17, along with other components of the system, reduce solar gain in the ballast enclosure 14 and allow efficient heat transfer between the ballast enclosure 14 and the ambient air. In a preferred embodiment, the sunshield 17 is insulated. In the embodiment shown in FIG. 1, the sunshield 17 is open to the environment to permit airflow over a surface of at least one of the plurality of enclosure walls 18 and is removably mounted adjacent the fluid channel 16.

Figure 6:
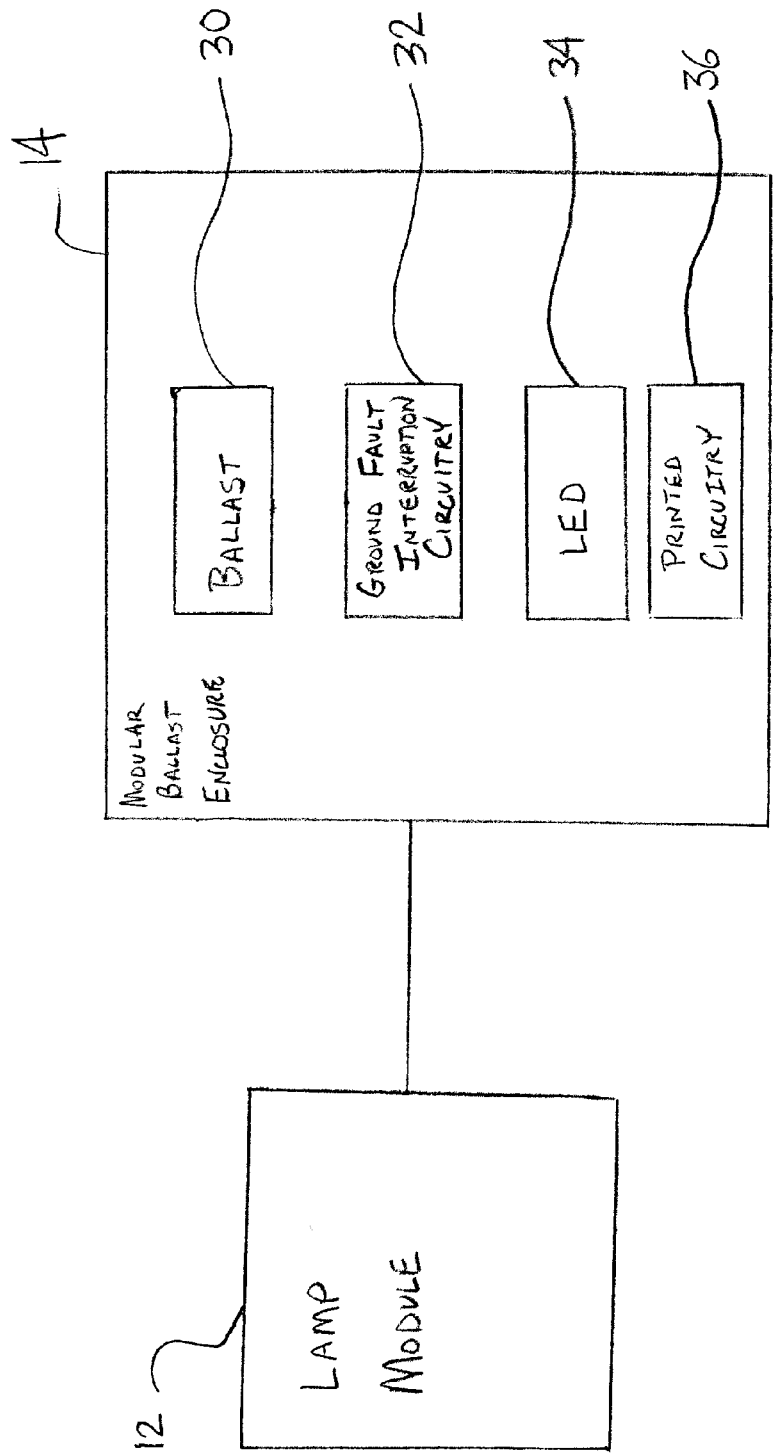
FIG. 6 is a simplified block diagram of a modular ballast enclosure according to another embodiment of the present invention.

Referring to FIG. 6, there is shown a preferred embodiment of disinfection system 10 in block diagram form in which the modular ballast enclosure 14 comprises at least one ballast 30 and other components for powering and monitoring a lamp module 12. The modular ballast enclosure 14 shown in FIG. 6 includes ground fault interruption circuitry 32, a light emitting diode (LED) 34, and printed circuitry 36 for monitoring and operating the lamp module 12. Monitoring by the printed circuitry 36 preferably includes lamp status, lapsed time of operation, UV lamp life, number of on/off cycles for the UV lamps, current to the UV lamps and ballast enclosure status. Operation by the printed circuitry 36 may include turning the UV lamps or the ballast enclosure on and off for flow pacing of the UV system 10. The LED 34 is associated with a lamp in the lamp module 12 and provides an indication of the status of the lamp. In the embodiment shown, each modular ballast enclosure 14 provides power and monitoring circuitry for each lamp module 12. For example, a UV system comprised often lamp modules 12, would include ten corresponding ballasts enclosures 14. However, it should be understood that the invention contemplates other than a 1:1 ratio of modular ballast enclosures 14 to lamp module 12.

The present invention may be embodied in other specific forms without departing from the spirit or essential attributes thereof and, accordingly, reference should be made to the appended claims, in addition to the foregoing specification, as indicating the scope of the invention.

What is claimed is:

1. A modular ballast enclosure used in connection with a fluid disinfection system containing a lamp module having a plurality of UV lamps positioned in a fluid channel and located remote from the enclosure comprising:
  at least one ballast for powering the lamp module;
  an enclosure wall sized and shaped to surround the ballast, said enclosure wall located adjacent to but separate from the fluid channel;
  a receptacle on the modular ballast enclosure adapted to receive a connection from the lamp module; and
  a power source connection cord connected to the ballast.

2. The modular ballast enclosure of claim 1, wherein the enclosure wall comprises a thermally conductive material.

3. The modular ballast enclosure of claim 1, further comprising a sunshield removably mounted to the enclosure.

4. The modular ballast enclosure of claim 3, wherein the sunshield is insulated.

5. The modular ballast enclosure of claim 3, wherein the sunshield forms an opening to permit air flow over a surface of the enclosure wall.

6. The modular ballast enclosure of claim 1, further comprising a ground fault interrupter circuit connected between a power source and the at least one ballast.

7. The modular ballast enclosure of claim 6, further comprising a light emitting diode "LED" connected to a lamp in the lamp module to indicate a status of the lamp.

8. The modular ballast enclosure of claim 1, further comprising printed circuitry for monitoring and operating the lamp module.

9. The modular ballast enclosure of claim 2, wherein the thermally conductive material is stainless steel or aluminum.

10. The modular ballast enclosure of claim 1, wherein the receptacle is a multi-pin receptacle.

11. The modular ballast enclosure of claim 1, wherein the modular ballast enclosure has a width substantially equal to a width of the lamp module.

12. The modular ballast enclosure of claim 11, wherein the width of the modular ballast enclosure is substantially about three inches.

13. The modular ballast enclosure of claim 1, wherein the enclosure wall is adapted for removable attachment to the fluid channel.

14. A system for disinfecting fluids in a channel comprising:
  a lamp module having at least one lamp positioned in the channel;
  a modular ballast enclosure positioned out of the channel and adapted to receive a power from a power source, the enclosure comprising:
    at least one ballast for powering the lamp module;
    an enclosure wall sized and shaped to surround the ballast, said enclosure wall located adjacent to but separate from the fluid channel;
    a receptacle on the modular ballast enclosure adapted to receive a connection from the lamp module; and
    a power source connection cord connected to the ballast.

15. The disinfection system of claim 14, further comprising a ground fault interrupter circuit connected between a power source and the at least one ballast, and a signal LED connected to the least one lamp to indicate a status of the lamp.

16. The disinfection system of claim 14, wherein the thermally conductive material is stainless steel or aluminum.

17. The disinfection system of claim 14, wherein the enclosure is removably mounted to said channel adjacent to the lamp module.

18. The disinfection system of claim 14, wherein the at least one lamp is an ultraviolet lamp.

19. The disinfection system of claim 14, wherein the cable has a pair of ends, and the disinfection system further comprises a quick disconnect plug substantially on at least one of the cable ends.

20. The disinfection system of claim 14, wherein the power source is controlled by a control panel.

21. The disinfection system of claim 14, wherein the modular ballast enclosure has an enclosure width that is substantially about three inches.

22. A modular ballast enclosure used in connection with a fluid disinfection system containing a lamp module having a plurality of UV lamps positioned in a fluid channel and located remote from the enclosure comprising:
  at least one ballast for powering the lamp module;
  an enclosure wall sized and shaped to surround the ballast and comprising a thermally conductive material, at least one portion of said enclosure wall being adjacent to but out of the channel, said enclosure wall having a width substantially equal to a width of the lamp module and wherein the ballast is removably mounted to the enclosure wall;

a ground fault interrupter circuit connected between a power source and the at least one ballast;

a light emitting diode "LED" connected to a UV lamp in the lamp module to indicate a status of the UV lamp;

a multi-pin receptacle adapted to receive a connection from the lamp module; and an insulated sunshield removably attached to the enclosure wall, the sunshield forming an opening to permit air flow over a surface of the enclosure wall.

23. A system for disinfecting fluids in a channel comprising:

a lamp module having at least one ultraviolet lamp positioned in the channel;

a modular ballast enclosure positioned out of the channel and constructed of a thermally conductive material, the enclosure comprising:

at least one ballast for powering the lamp module;

an enclosure wall sized and shaped to surround the ballast, said enclosure wall located adjacent to but separate from the fluid channel;

a receptacle on the modular ballast enclosure adapted to receive a connection from the lamp module; and a power source connection cord connected to the ballast.

* * * * *